(12) United States Patent
Chiang

(10) Patent No.: US 7,167,429 B2
(45) Date of Patent: Jan. 23, 2007

(54) METHOD FOR DEFECT MANAGEMENT OF AN OPTICAL STORAGE MEDIUM WITH A SORTING PROCESS

(75) Inventor: Chun-Ying Chiang, Chia-I (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 446 days.

(21) Appl. No.: 10/709,163

(22) Filed: Apr. 19, 2004

(65) Prior Publication Data

US 2004/0228240 A1    Nov. 18, 2004

(30) Foreign Application Priority Data

May 15, 2003   (TW) ................................ 92113212 A

(51) Int. Cl.
*G11B 5/09* (2006.01)
(52) U.S. Cl. ................ 369/53.17; 369/53.2; 369/53.15; 369/47.14
(58) Field of Classification Search ...................... None
See application file for complete search history.

(56) References Cited

U.S. PATENT DOCUMENTS

| | | | |
|---|---|---|---|
| 2001/0022763 A1* | 9/2001 | Ishibashi ................. | 369/53.15 |
| 2002/0181356 A1* | 12/2002 | Watanabe et al. ......... | 369/47.16 |
| 2004/0174785 A1* | 9/2004 | Ueda et al. .............. | 369/47.14 |

* cited by examiner

*Primary Examiner*—Muhammad Edun
(74) *Attorney, Agent, or Firm*—Winston Hsu

(57) ABSTRACT

A method for recording a plurality of data sets onto an optical storage medium by utilizing a temporary storage device in an optical storage system. The optical storage medium contains a plurality of data blocks and a plurality of spare data blocks. Each data block is utilized for recording a data set, and each spare data block is utilized for substituting for a defective data block to record the corresponding data set. The method comprises: storing a plurality of data sets corresponding to a plurality of defective data blocks in the memory into the temporary storage device; re-arranging a sequence of the plurality of data sets corresponding to the plurality of defective data blocks in the temporary storage device according to a sorting process; and recording the re-arranged data sets in the temporary storage device into the spare data blocks of the optical storage medium.

16 Claims, 12 Drawing Sheets

|  | DPBN | RPBN |
|---|---|---|
| Bd(3) | DPBN(3):0x71400 | RPBN(3):0x221220 |
| Bd(1) | DPBN(1):0x71480 | RPBN(1):0x221200 |
| Bd(4) | DPBN(4):0x71520 | RPBN(4):0x221230 |
| Bd(2) | DPBN(2):0x71550 | RPBN(2):0x221210 |
| Bd(5) | DPBN(5):0x715A0 | RPBN(5):0x221240 |

Fig. 5  Prior art

|  | DPBN | RPBN | Index |
|---|---|---|---|
| Bd(1) | DPBN(1):0x71480 | RPBN(1):0x221200 | 0x50 |
| Bd(2) | DPBN(2):0x71550 | RPBN(2):0x221210 | 0xA0 |
| Bd(3) | DPBN(3):0x71400 | RPBN(3):0x221220 | 0x30 |
| Bd(4) | DPBN(4):0x71520 | RPBN(4):0x221230 | 0x80 |
| Bd(5) | DPBN(5):0x715A0 | RPBN(5):0x221240 | 0xD0 |

METHOD FOR DEFECT MANAGEMENT OF AN OPTICAL STORAGE MEDIUM WITH A SORTING PROCESS

BACKGROUND OF INVENTION

1. Field of the Invention

The present invention is generally related to a method for recording a plurality of data sets onto an optical storage medium, and more specifically, to a method by utilizing a temporary storage device in an optical storage system to record a plurality of data sets that is corresponding to a plurality of defective data blocks onto an optical storage medium according to a sorting process.

2. Description of the Prior Art

Upon the arrival of the era for communications and multimedia, the demand for higher density and capacity of storage media in computers, communication devices, and consumer electronics is continuously increasing. As data transmission increases, the need for high density, ultra compact, and cost-efficient storage media is our focus. Storage media such as an optical disc provides low cost yet portable and lightweight storage and has sufficient data capacity, which has become the preferred choice in the modern society as the most popular format for multimedia storage. Especially in the research and development in re-writable optical discs that allow users to input data onto the optical disc according to personal preferences therefore optical disc has become the most significant form of multimedia storage. As a result, the method for producing high reliable and high efficient optical discs for multimedia storage is the main focus of the industry.

An optical storage medium (e.g., an optical disc) is primarily placed in an optical storage system, such as an optical disk drive. Please refer to FIG. 1, which is a schematic block diagram of an optical disk drive 10 for accessing an optical disc 22 according to the prior art. The optical disk drive 10 comprises a loader 14, a motor 12 utilized for rotating the loader, a pickup head 16 utilized for accessing the data sets in the optical disc, a control circuitry 18 utilized for controlling the operation of the optical disk drive 10, and a memory 20. The memory 20 utilized for temporarily storing the data sets necessary for the operation of the control circuitry 18 can be a volatile Dynamic Random Access Memory (DRAM) or other kinds of memory devices. The optical disc 22 comprises a plurality of tracks 24 utilized for recording the data sets. When the optical disc 22 is placed on the loader 14, the motor 12 can drive the optical disc 22 to rotate. By the rotation of the optical disc 22, the tracks 24 of the optical disc 22 are swept by the pickup head 16, and the control circuitry 18 can access the data sets on the tracks 24 through the pickup head 16. The control circuitry 18 accesses the data sets of the optical disc 22 according to the control of a host 26, and the host 26 can be a computer system of a personal computer.

As we want to achieve the function of the optical disc 22 in FIG. 1 for recording data sets more reliably and durably, certain defect management mechanisms have already been set in optical disc standards. One of the general methods is to divide the optical disc 22 into several parts and assign some of them to be spare record areas. When there are defective areas of the optical disc 22 where they cannot be utilized for recording data sets, the data sets that are originally to be recorded into the defective areas will be recorded into the spare record areas. Hence, the data recording function of the optical disc 22 is not affected by the defective areas. Please refer to FIG. 2, which is a schematic diagram of the configuration of a spare record area and a general record area conforming to a DVD (Digital Versatile Disk)+ MRW standard. In FIG. 1, each track 24 of the optical disc 22 utilized for recording data sets is regarded to be divided into several large areas a lead-in area LI, a data zone DZ, and a lead-out area LO, respectively. The lead-in area LI, the lead-out area LO are respectively utilized for indicating the beginning and the ending of the track 24, and the data zone DZ is utilized for recording data sets. In the lead-in area LI, there is a main table area (MTA) utilized for storing a defective table DT. The data zone DZ is divided into a general application area GAA; a secondary table area STA for storing a backup of a defective table; a user data area UDA; and two spare areas SA1 and SA2. The user data area UDA comprises a plurality of data blocks Bd. Each data block Bd is utilized for recording a data set, and the spare areas SA1 and SA2 respectively comprise a plurality of spare data blocks Bs as well. Each spare data block Bs is also utilized for recording a data set. The capacity of a data block Bd and the capacity of a spare data block Bs are identical. A data block Bd and a spare data block Bs can respectively be a standard space for recording data sets.

Please proceed to refer to FIG. 1 and FIG. 2. When the optical disk drive 10 records a plurality of data sets transmitted from the host 26 onto the optical disc 22, these data sets will be temporarily stored into the memory 20 which are recorded into data blocks Bd of the track 24. If a defective data block Bd being unable to be utilized for recording a data set exists, it is necessary to find out a spare data block Bs on the track 24 as a replacement, (a spare data block Bs in the spare area SA2 is usually utilized) and record the data set which is supposedly to be recorded into the defective data block Bd into the spare data block Bs as a replacement. Please refer to FIG. 3, which is a schematic diagram of a detailed embodiment of the memory 20 in FIG. 1. The memory 20 comprises a main storing section 27 and a spare storing section 29. The main storing section 27 is utilized for storing a plurality of data sets transmitted from the above-mentioned host 26. After some data sets corresponding to the defective data blocks Bd are inspected, those data sets corresponding to the defective data blocks Bd will be marked, sent to, and stored in the spare storing section 29, and finally recorded into the spare data blocks Bs as replacements. In actual operation, each spare data block Bs and each data block Bd respectively have its own number such as a physical block number (PBN). For a clear description, it is defined in the present embodiment that each data set corresponding to a defective data block Bd corresponds to a RPBN (replace PBN), and each original defective data block Bd also corresponds to a DPBN (defective PBN). The relationship between a defective data block Bd and a corresponding spare data block Bs utilized for substituting for the defective data block Bd is recorded into the defective table DT of the above-mentioned optical disc 22, namely, each relationship between a corresponding RPBN and a DPBN is recorded into the defective table DT. Please refer to FIG. 4, which is a schematic diagram of an embodiment of a defect management mechanism according to the prior art. FIG. 4 shows that there are five defective data blocks Bd(1)–Bd(5) in the user data area UDA of the track 24 in FIG. 1, wherein the data blocks Bd(1) and Bd(2) are the defective data blocks Bd that are checked and marked during last operation. The data blocks Bd(1) and Bd(2) correspond to DPBN(1), DPBN(2) and RPBN(1), RPBN(2), respectively. The data blocks Bd(3), Bd(4) and Bd(5) are the defective data blocks Bd that are checked and marked during the present operation. The data blocks Bd(3), Bd(4) and Bd(5) correspond to DPBN(3), DPBN(4), DPBN(5) and RPBN(3), RPBN(4), RPBN(5), respectively.

The embodiment of FIG. 4 also shows the corresponding relationship between a user data area UDA of the track 24 in FIG. 1 and the memory 20. During the last operation, RPBN(1) and RPBN(2) corresponding to the defective data blocks Bd are checked and marked and have two consecutive numbers. In the present embodiment, RPBN(1) and RPBN(2) are respectively set to 0X221200 and 0X221210. Please refer to FIG. 5 for the detailed description. The defective physical block numbers DPBNs and the replace physical block numbers RPBNs corresponding to the five defective data blocks Bd(1)–Bd(5) in FIG. 4 are arranged according to the sequence after the check operation of the present operation is performed. FIG. 5 is a table according to an embodiment showing the five defective data blocks in FIG. 4 according to the sequence stored in the spare storing section 29. During the present operation, RPBN(3), RPBN(4) and RPBN(5) that are assigned by the corresponding and checked defective data blocks Bd are also three consecutive numbers 0X221220, 0X221230 and 0X221240, respectively. As mentioned above, before the five data sets (respectively corresponding to the five defective data blocks Bd(1)–Bd(5)) are recorded into the spare data blocks Bs as replacements, (for example, the five spare data blocks Bs being replacements can be Bs(1)–Bs(5)), the five data sets will be sent to and temporarily stored in the spare storing section 29 according to the sequence "Bd(3), Bd(1), Bd(4), Bd(2), Bd(5)" after the present operation. Finally the five data sets are recorded into the corresponding spare data blocks Bs. According to the principles of the above-mentioned operation, even if some segments of the optical disc 22 in FIG. 1 are defective (for example, the defective segments are due to scratches or dusts), the defect management is accomplished by utilizing the spare data blocks Bs to maintain the data recording function of the optical disc 22.

In summary, please refer to FIG. 6 which is a flow chart of the data recording function of the optical disc 22 according to the prior art. The function of the optical disc 22 for recording of data sets conforms to a DVD+MRW standard and comprises the above-mentioned defect management to enhance the reliability of the data recording function of the optical disc 22. The process according to the prior art comprises the following steps:

Step 100: Start;

Step 102: The optical disk drive 10 receives an instruction for recording data sets transmitted from the host 26 and it becomes ready to record a plurality of data sets transmitted from the host 26 onto the optical disc 22. Before the optical disk drive 10 records the data sets onto the optical disc 22, the data sets transmitted from the host 26 will be first temporarily stored in the main storing section 27 of the memory 20;

Step 104: In the process of storing a data set transmitted from the host 26, the main storing section 27 of the memory 20 is determined whether it is full; if the main storing section 27 is full, the process of storing data sets into the main storing section 27 of the memory 20 will be paused, and go to step 106;

Step 106: Check if any defective data blocks Bd exist in the data recording process of the optical disc 22. If a defective data block Bd exists, go to step 108; if not, go to step 112;

Step 108: According to the prior art, once if defective data blocks Bd exist, the defective data blocks Bd will be marked, and the corresponding data sets will be first sent to and stored in the spare storing section 29 of the memory 20;

Step 110: Record the data sets that are temporarily stored in the spare storing section 29 of the memory 20 and are supposedly recorded into the defective data blocks Bd into the spare data blocks Bs as replacements. According to the defective table DT, the optical disk drive 10 can find out the numbers of spare data blocks Bs corresponding to defective data blocks Bd, and make the pickup head 16 seek to the locations of the spare data blocks Bs as replacements. The data sets will be recorded into the corresponding spare data blocks Bs of the optical disc 22 to maintain the data recording function of the optical disc 22;

Step 112: Proceed to record the data sets normally, namely, to record the data sets into the data block Bd assigned by the host 26. If the process is from step 110 to the present step, which means that after the optical disk drive 10 moves the pickup head 16 in the step 110 to record the data sets into the spare data blocks Bs, the optical disk drive 10 moves the pickup head 16 again to the locations of the corresponding data blocks Bd, and proceed to record the data sets;

Step 114: Determine if any new request of data recording is received. If yes, go back to step 102 and process the following data recording; if not, go to step 116;

Step 116: End the operation of data recording, and finish the process according to the prior art.

Please refer back to FIG. 4. As mentioned above, the sequence of the five data sets in the spare storing section 29 of the memory 20 is "Bd(3), Bd(1), Bd(4), Bd(2), Bd(5)". Please note that for the RPBNs, at this point, the sequence of the five data sets in the above-mentioned spare storing section 29 is composed of five inconsecutive numbers. Please refer back to FIG. 5. In the embodiment according to the prior art, the discontinuity of the five RPBNs corresponding to the five data sets is emphasized. As mentioned in step 110 in FIG. 6, when the defective data blocks Bd have been found resulting in the data sets that are temporarily stored in the spare storing section 29 being recorded into the spare data blocks Bs as replacements, the pickup head 16 must seek tracks until the corresponding locations of the spare data blocks Bs are reached for recording the data sets into the spare data blocks Bs instead of the defective data blocks Bd. However, during a seeking process, the pickup head 16 can only record the data sets into a plurality of adjacent spare data blocks Bs, and these adjacent spare data blocks Bs correspond to the consecutive RPBNs. In other words, if the sequence of data recording corresponds to the inconsecutive RPBNs, the pickup head 16 must separately record a plurality of data sets into the corresponding spare data blocks Bs in different seeking processes. Please refer back to the embodiment in FIG. 4, because the sequence of the five data sets ("Bd(3), Bd(1), Bd(4), Bd(2), Bd(5)") in the spare storing section 29 is composed of five inconsecutive RPBNs, such that the pickup head 16 must separately record the five data sets into the corresponding spare data blocks Bs in five different seeking processes and not at all by the same seeking process.

Please refer back to the optical disc standard in FIG. 2. The areas occupied by each spare data block Bs in the optical disc 22 (such as the spare areas SA1 and SA2) and the areas occupied by the data blocks Bd (a user data area UDA) are alternatively interlaced onto the track 24. Hence, the pickup head 16 may move from the original number corresponding to a data block Bd to the number corresponding to the spare data block Bs in each seeking process. It is necessary to proceed the long-distance and crossing-track move, in which the time-consumption during the seeking process is inevitable. If the amount of data sets having inconsecutive RPBNs is increased, the efficiency of data recording function of the optical disc 22 is rapidly reduced due to the frequent seeking processes according to the prior art. The operational burden of the actuating mechanisms of the pickup head 16 in FIG. 1 is also increased, causing it to wear out easily. Moreover, in the above-mentioned embodiment, the data sets are first sent to the spare storing section 29 for storage, and are recorded into the spare data blocks Bs by one seeking process or several seeking processes. The design mentioned above limits the amount of data sets corresponding to the defective data blocks Bd, which can be processed during each seeking process, to the capacity of the spare storing section 29 of the memory 20. Usually for the design of the memory 20, the capacity of the main storing section 27 is far greater than the capacity of the spare storing section 29. If the amount of defective data blocks Bd checked is greater than the capacity of the spare storing section 29 during a recording operation, it is inevitable that the recording operation has to be accomplished by several operations to reduce the efficiency of the data recording process of the optical disc. Please note that the above-mentioned embodiments from FIG. 2 to FIG. 6 are the operating conditions according to the DVD (Digital Versatile Disk)+MRW standard. If the related configuration and the recording operation is almost the same as those mentioned above according to different optical disc standards such as a CD-MRW (Compact Disk-Mount Rainier reWritable) standard, namely, the speed of recording data sets may be limited to the capacity of the spare storing section 29 or too many seeking processes.

SUMMARY OF INVENTION

It is therefore a primary objective of the claimed invention to provide a method for recording a plurality of data sets onto an optical storage medium after re-arranging the data sets according to a sorting process in an optical storage system. The purpose is to reduce the seeking processes in order to solve the above-mentioned problems.

In the method and structure disclosed in the claimed invention, a temporary storage device is utilized to store a plurality of data sets corresponding to the defective data blocks in the main storing section. Then the data sets stored in the temporary storage device are re-arranged according to a sorting process, such that before the data sets are recorded into the spare storing section of the memory and the spare data blocks of the optical disc, the sequence of the RPBNs corresponding to the data sets is optimized. Moreover, the main storing section and the spare storing section of the claimed invention are respectively a ring buffer memory. To co-operate with the installation of the temporary storage device and the utilization of the sorting process, the seeking processes necessary for the defect management of the optical disc are reduced rapidly, and the amount of defective data blocks which can be processed during a seeking process is not limited to the capacity of the spare storing section.

The objective of the claimed invention is to provide a method for recording a plurality of data sets onto an optical storage medium by utilizing a temporary storage device in an optical storage system. The optical storage system further comprises a memory for storing the plurality of data sets. The optical storage medium comprises a plurality of data blocks and a plurality of spare data blocks. Each data block is utilized for recording a data set, and each spare data block is a replacement for a defective data block to record the data set corresponding to the defective data block. The method comprises the following steps: storing a plurality of data sets corresponding to a plurality of defective data blocks in the memory into the temporary storage device; re-arranging a sequence of the plurality of data sets corresponding to the plurality of defective data blocks in the temporary storage device according to a sorting process; and recording the plurality of re-arranged data sets in the temporary storage device into the plurality of spare data blocks of the optical storage medium.

Another objective of the claimed invention is to provide a method for recording a plurality of data sets onto an optical storage medium in an optical storage system to reduce seeking processes. The optical storage medium comprises a plurality of data blocks and a plurality of spare data blocks. Each data block is utilized for recording a data set, and each spare data block is a replacement for a defective data block to record the data set corresponding to the defective data block. The optical storage system comprises a memory which comprises a main storing section, a spare storing section, and a temporary storage device electrically coupled to the memory to temporarily store the data sets. The method comprises the following steps: utilizing the main storing section to temporarily store the data sets; recording a pre-determined number of data sets corresponding to the pre-determined number of defective data blocks in the main storing section into the temporary storage device, wherein the predetermined number depends on the capacity of the memory of the main storing section; re-arranging a sequence of the predetermined number of data sets in the temporary storage device according to a sorting process; recording the predetermined number of the re-arranged data sets in the temporary storage device into the spare storing section; and recording the predetermined number of the re-arranged data sets in the spare storing section into the predetermined number of the corresponding spare data blocks in an optical storage medium.

Another objective of the claimed invention is to provide a method for recording a plurality of data sets into a plurality of adjacent spare data blocks in an optical storage medium during a seeking process. Each data set corresponds to a spare data block number, and each spare data block number corresponds to a spare data block. The method comprises (a) re-arranging the plurality of data sets according to the sequence of the plurality of corresponding spare data block numbers, such that the plurality of spare data block numbers corresponding to the plurality of re-arranged data sets is consecutive spare data block numbers; and (b) after performing step (a), recording the plurality of re-arranged data sets into the plurality of adjacent spare data blocks during a seeking process.

These and other objectives of the claimed invention will no doubt become obvious to those of ordinary skill in the art after reading the following detailed description of the preferred embodiment, which is illustrated in the various figures and drawings.

BRIEF DESCRIPTION OF DRAWINGS

FIG. 5 is a table according to an embodiment showing the five defective data blocks in FIG. 4 according to the sequence stored in the spare storing section.

FIG. 10 is a table showing a sequence of the five defective data blocks in FIG. 9 after the sorting process of the present invention.

DETAILED DESCRIPTION

Figure 1:
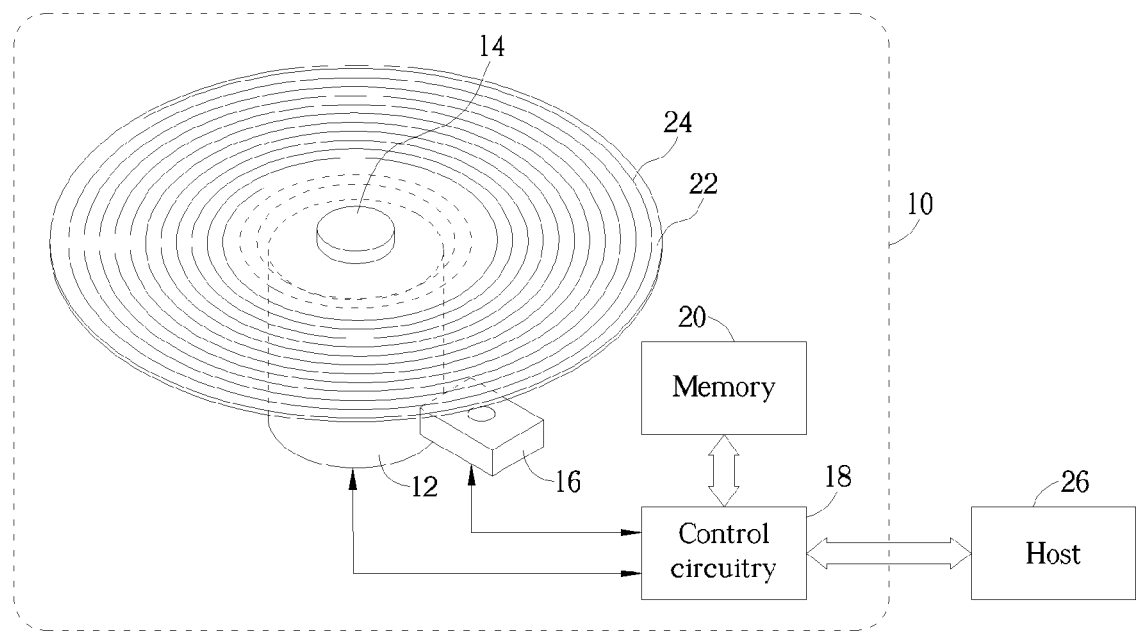
FIG. 1 is a schematic block diagram of an optical disk drive for accessing an optical disc according to the prior art.
Figure 2:
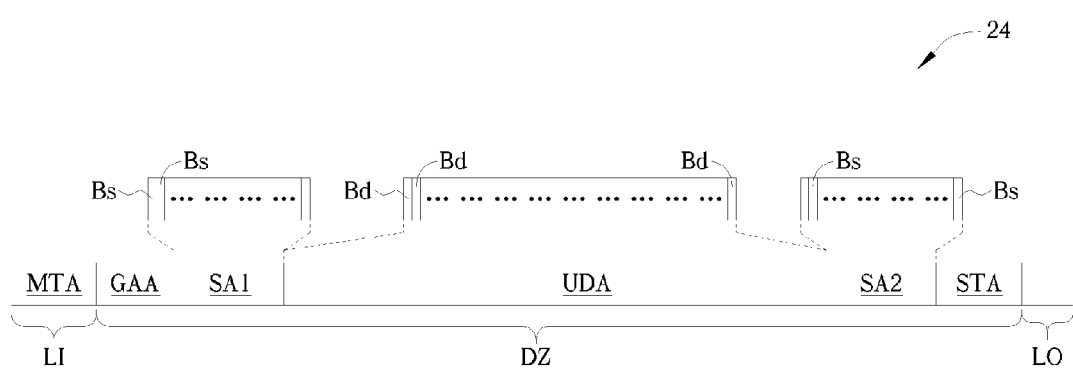
FIG. 2 is a schematic diagram of the configuration of a spare record area and a general record area conforming to a DVD(Digital Versatile Disk)+MRW standard.
Figure 7:
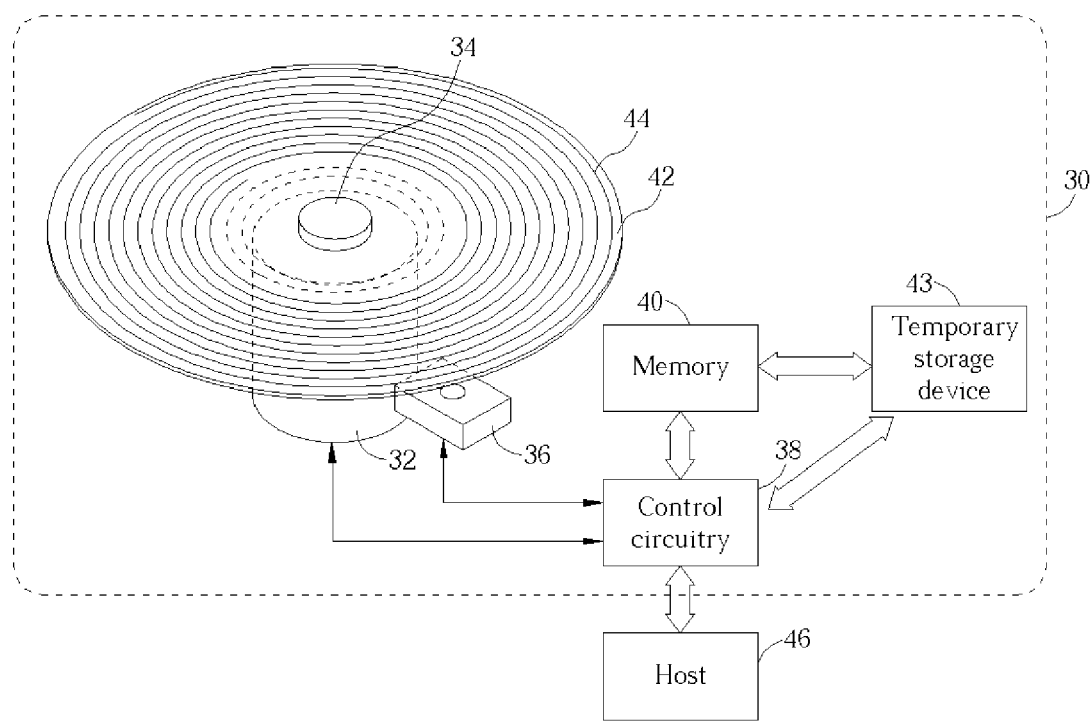
FIG. 7 is a schematic block diagram of an optical disk drive for accessing an optical disc according to the present invention.

The disclosed method and structure in the present invention, taking a standard of DVD+MRW in FIG. 2 for example, are based on an existed standard arrangement of spare record areas and general record areas to propose a new method of defect management of data sets to enhance the efficiency of the data recording function of the optical disc. The above-mentioned optical disc can be an optical disc such as a CD-MRW (Compact Disk-Mount Rainier ReWritable) standard, DVD (Digital Versatile Disk)+MRW standard, or other kinds of optical storage media for rewriting data sets. Please refer to FIG. 7, which is a schematic block diagram of an optical disk drive 30 for accessing an optical disc 42 according to the present invention. The major difference is that a temporary storage device 43 is added in the present embodiment. By utilizing the present invention, users can control the optical disk drive 30 for accessing the data sets of the optical disc 42 through the host 46 (such as the computer system of a personal computer). With reference to the embodiment shown in FIG. 1 according to the prior art, the optical disk drive 30 in the present embodiment comprises a loader 34, a motor 32 utilized for rotating the loader, a pickup head 36 utilized for accessing the data sets of the optical disc 22, a control circuitry 38 utilized for controlling the operation of the optical disk drive 30, and a memory 40. The temporary storage device 43 and the memory 40 respectively can be a volatile dynamic random access memory (DRAM) or other kinds of memory devices for storing the data sets in the operation of the control circuitry 38. The optical disc 42 comprises a plurality of the tracks 44 utilized for recording data sets. The control circuitry 38 accesses the data sets on the track 44 through the pickup head 36. Please refer back to FIG. 2 for the configuration of the spare record areas and the general record areas on the track 44. In another embodiment in the present invention, a data block is marked with a tag Bnd, and a spare data block is marked with a tag Bns.

Figure 3:
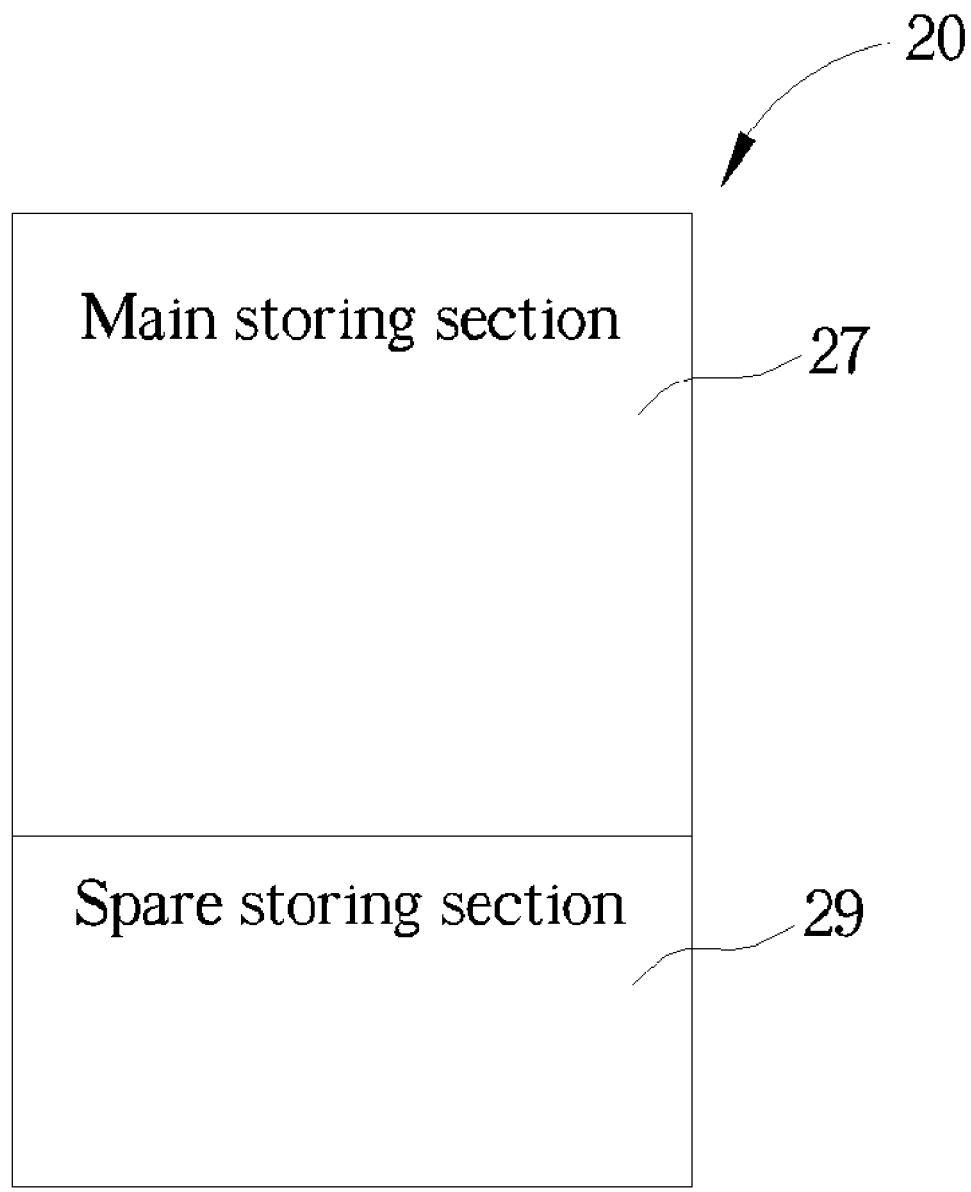
FIG. 3 is a schematic diagram of a detailed embodiment of a memory in FIG. 1.
Figure 4:
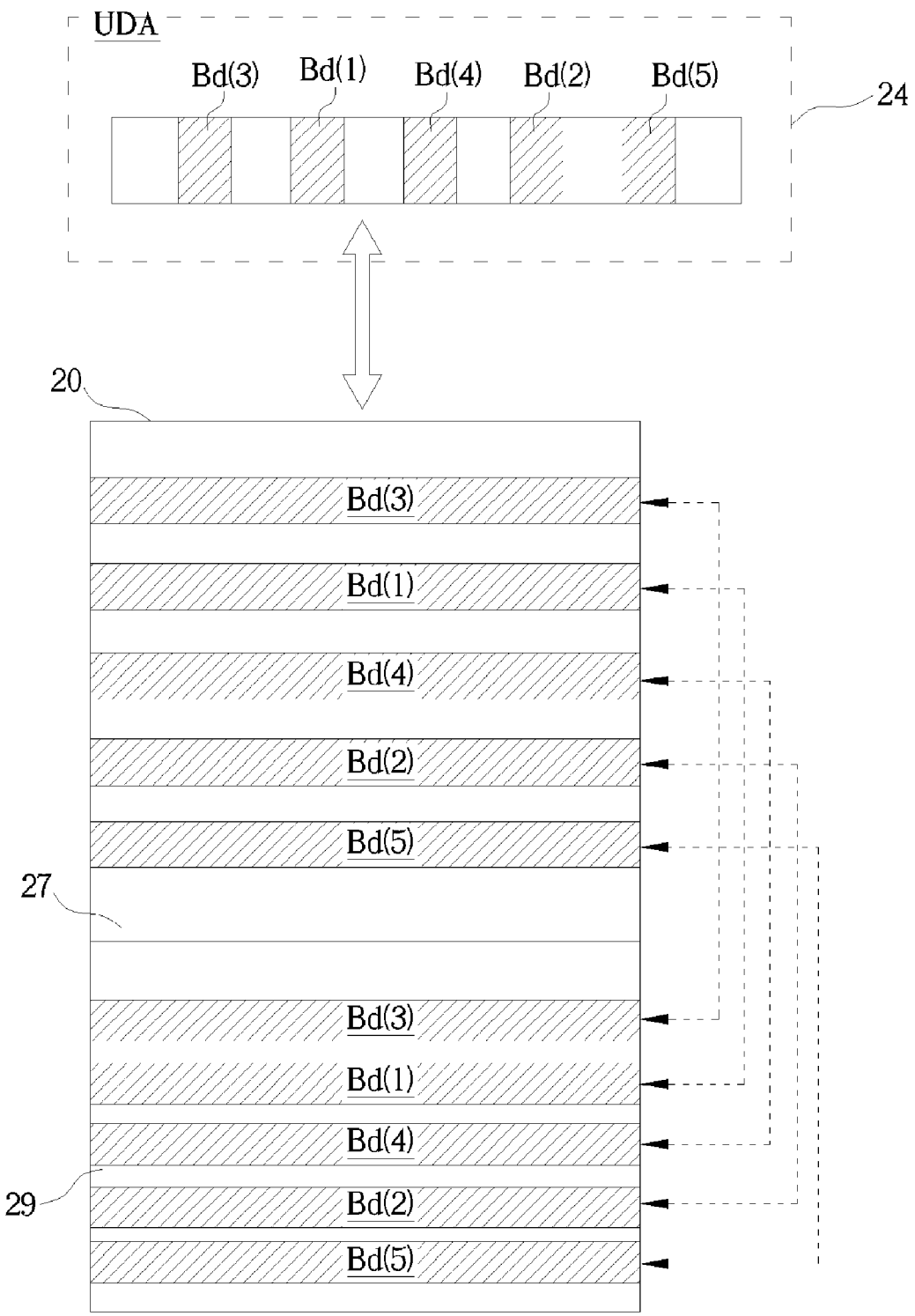
FIG. 4 is a schematic diagram of an embodiment of a defect management mechanism according to the prior art.
Figure 6:
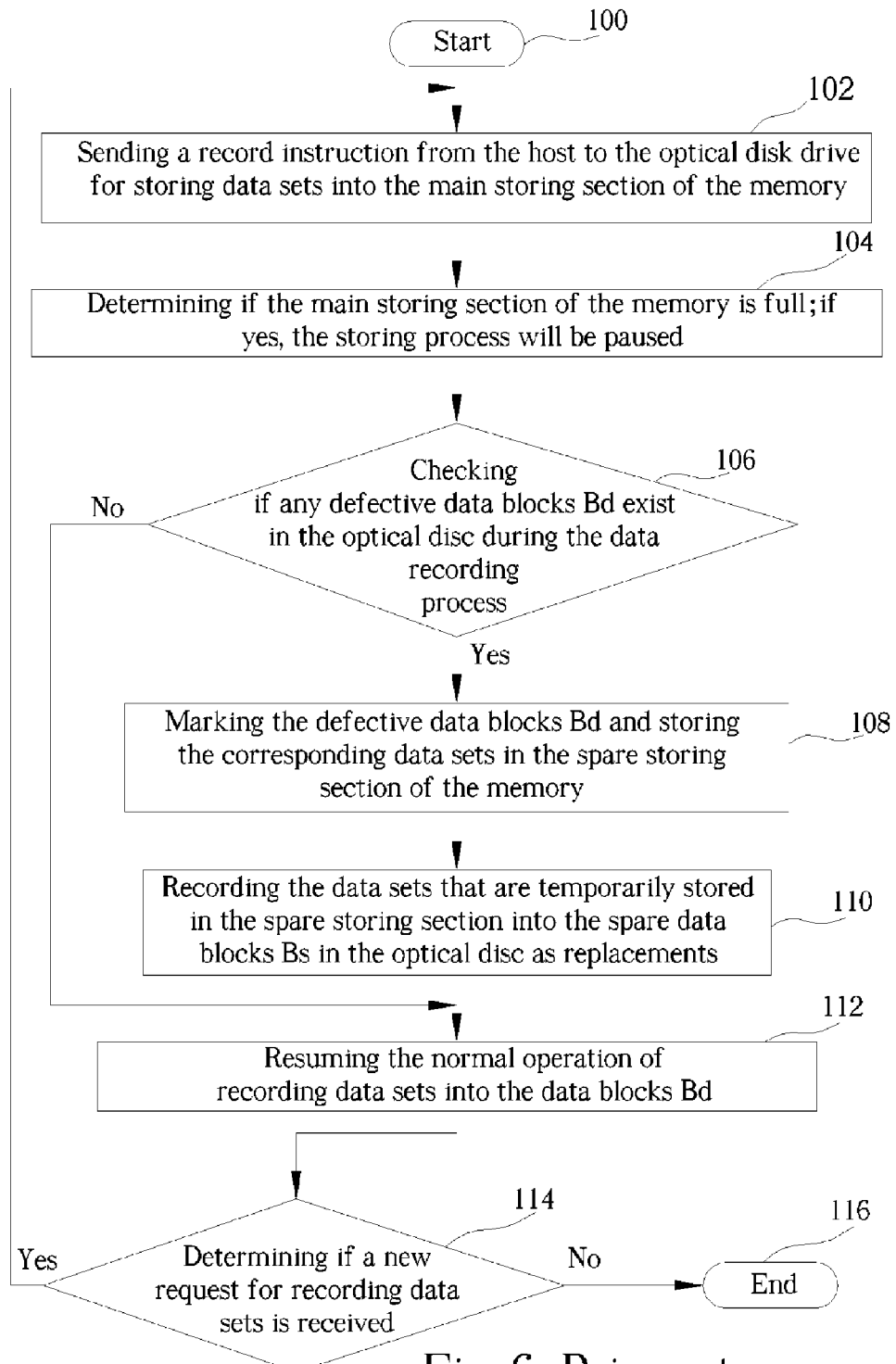
FIG. 6 is a flowchart of the data recording function of an optical disc according to the prior art.
Figure 8:
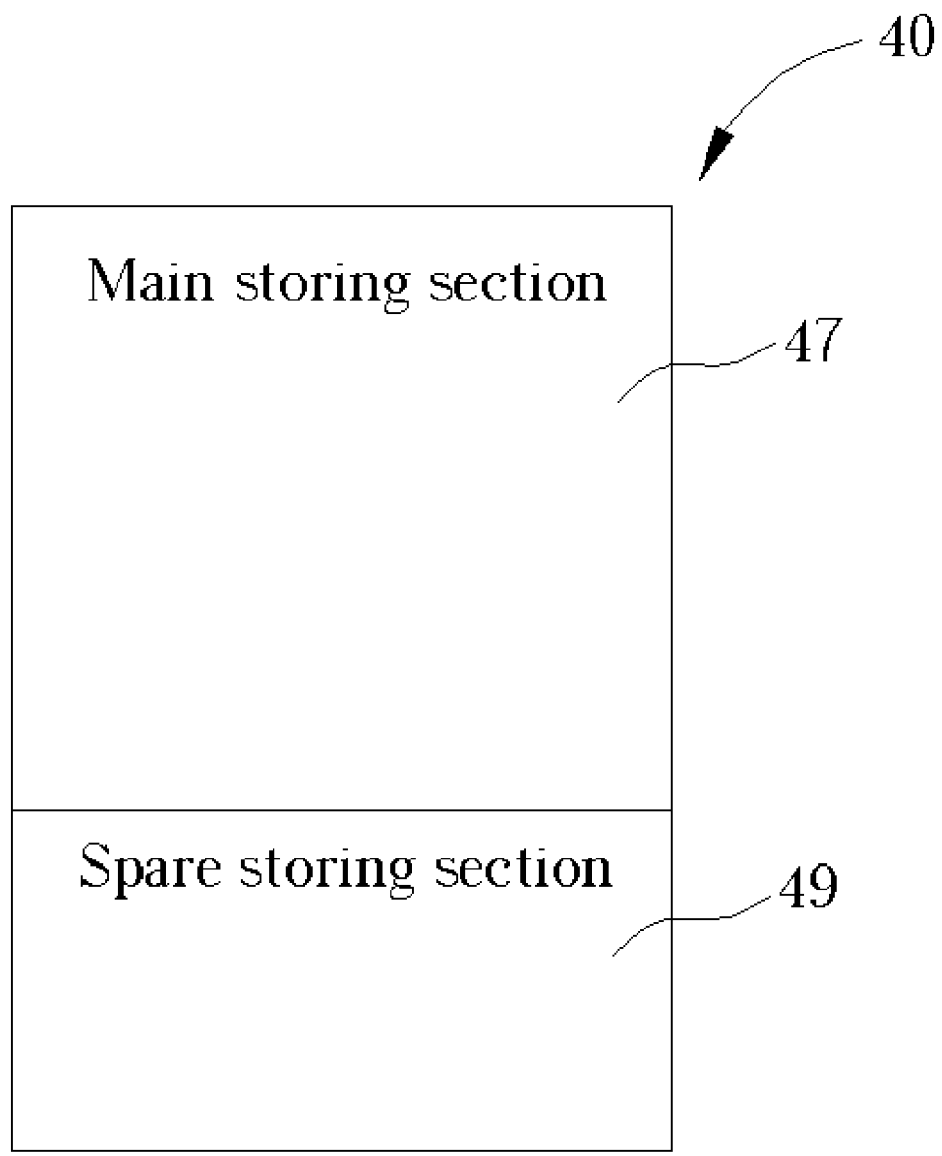
FIG. 8 is a schematic diagram of a detailed embodiment of a memory in FIG. 7.
Figure 9:
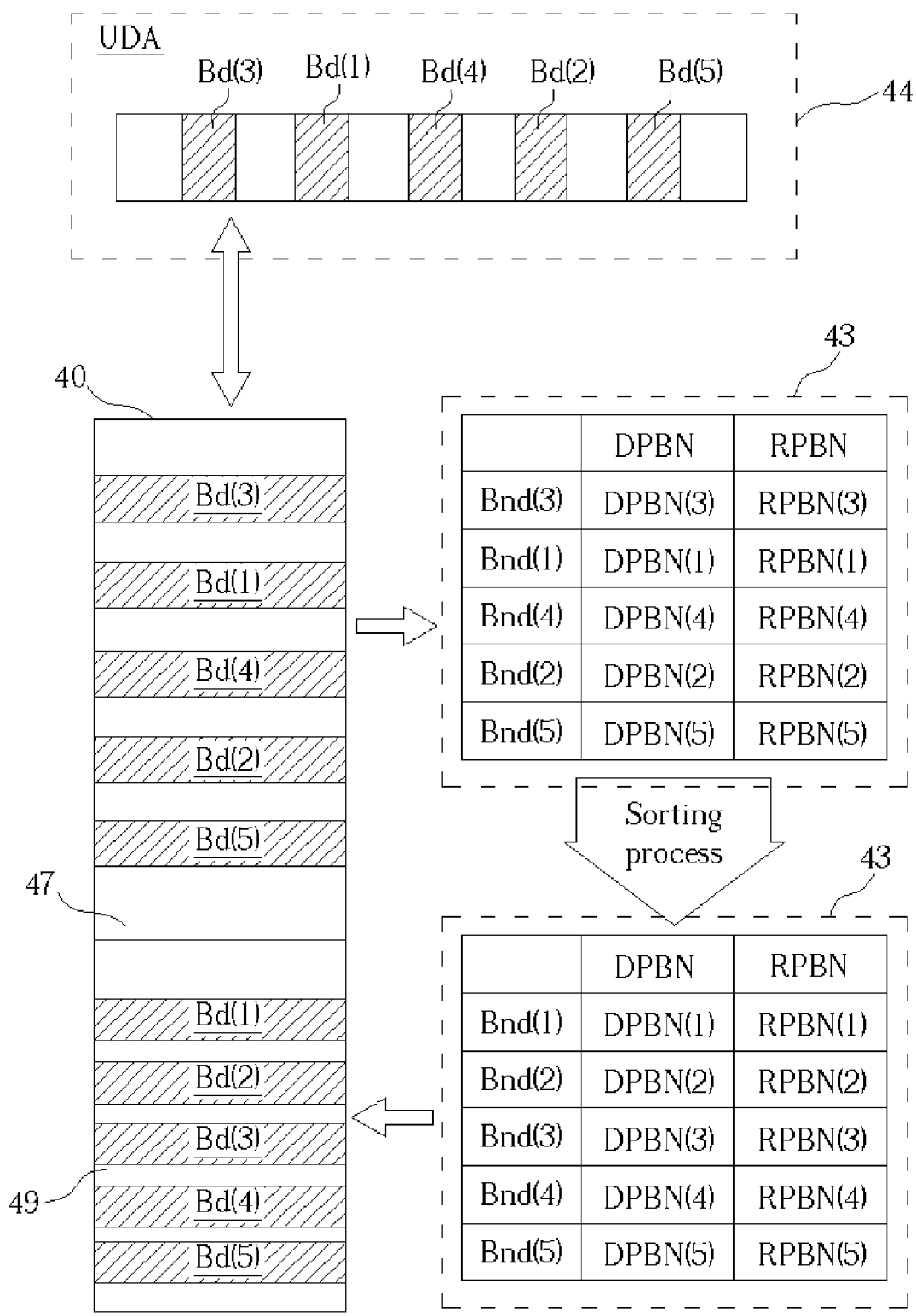
FIG. 9 is a schematic diagram of an embodiment of a defect management mechanism of an optical disc according to the present invention.

Please refer to FIG. 8 for the configuration of the above-mentioned memory 40. FIG. 8 is a schematic diagram of a detailed embodiment of the memory 40 in FIG. 7. The memory 40 is divided into a main storing section 47 and a spare storing section 49. Please refer back to the embodiment in FIG. 3. The functions of the main storing section 47 and those of the spare storing section 49 of the memory 40 in the embodiment in FIG. 8 are similar to those in the embodiment in FIG. 3 so detailed descriptions are therefore omitted. A plurality of data sets transmitted from the above-mentioned host 46 are stored into the main storing section 47. After some data sets corresponding to the defective data blocks Bnd are checked, the data sets corresponding to the defective data blocks Bnd will be marked and sent to the spare storing section 49 to be stored in, and then recorded into the spare data blocks Bns as replacements. According to the prior art, a large number of seeking processes are inevitable when recording the data sets into the spare data blocks Bns as replacements, because the data sets stored in the spare storing section 49 of the memory 40 have inconsecutive RPBNs. However, a large number of seeking processes will reduce the efficiency of recording data sets. By utilizing the newly-added temporary storage device 43 in FIG. 7 and the sorting process according to the present invention, the data sets which will be recorded into the spare data blocks Bns are re-arranged to achieve the major purpose of the present invention. Please refer to FIG. 9, which is a schematic diagram of an embodiment of a defect management mechanism of the optical disc 42 according to the present invention. For a clear comparison, we continue using the embodiments shown in FIG. 4 and FIG. 5 as examples. FIG. 9 shows that there are five defective data blocks Bnd(1)–Bnd(5) in a user data area UDA of the track 44 in FIG. 7, wherein the data block Bnd(1) and Bnd(2) are the defective data blocks Bnd that are checked and marked in the last operation. Please note that each data set corresponding to a defective data block Bnd corresponds to a RPBN, and each original defective data block Bnd has a corresponding DPBN. The relationship between a defective data block Bnd and a spare data block Bns utilized for substituting a corresponding defective data block Bnd is recorded in a defective table DT of the optical disc 42 (not shown in FIG. 7), namely, the defective table DT records each relationship between a RPBN and a DPBN. The data blocks Bnd(1) and Bnd(2) correspond to DPBN(1), DPBN(2) and RPBN(1), RPBN(2) respectively. The remaining defective data blocks Bnd(3), Bnd(4) and Bnd(5) that are checked and marked in the present operation correspond to the DPBN(3), DPBN(4), DPBN(5), and RPBN(3), RPBN(4), RPBN(5) respectively.

The embodiment in FIG. 9 shows the relationship between a user data area UDA of the track 44, the temporary storage device 43 and the memory 40. One of the characters of the present invention is that before recording the data sets corresponding to the defective data blocks Bnd in the main storing section 47 into the spare storing section 49, the data sets are first temporarily recorded into the temporary storage device 43. As shown in FIG. 9, the five data sets will be sent to and temporarily stored in the temporary storage device 43 according to the sequence after the present operation "Bnd (3), Bnd(1), Bnd(4), Bnd(2), Bnd(5)" is performed. Afterwards, in the present embodiment, the five data sets in the temporary storage device 43 will be re-arranged according to a sequence of RPBNs and the above-mentioned sorting process, such that the sequence of the re-arranged data sets after the sorting process is the optimized sequence of the RPBNs corresponding to the re-arranged data sets. The sequence of the five data sets originally stored in the temporary storage device 43 is "Bnd(3), Bnd(1), Bnd(4), Bnd(2), Bnd(5)". After the sorting process, the sequence of the five data sets originally stored the temporary storage device 43 becomes "Bnd(1), Bnd(2), Bnd(3), Bnd(4), Bnd (5)". Please refer to FIG. 10, which is a table showing the sequence of the five defective data blocks Bnd(1)–Bnd(5) in FIG. 9 after the sorting process. The table showing the sequence after the sorting process also demonstrates the detailed embodiment of the DPBNs and the RPBNs corresponding to the five data sets. FIG. 10 adopts the detailed data of RPBN(1)–RPBN(5) in FIG. 5 and the detailed data of the DPBN(1)–DPBN(5). The temporary storage indices (one index represents a number of a data set stored in the main storing section 47 of the memory 40) are also added in FIG. 10.

Figure 11:
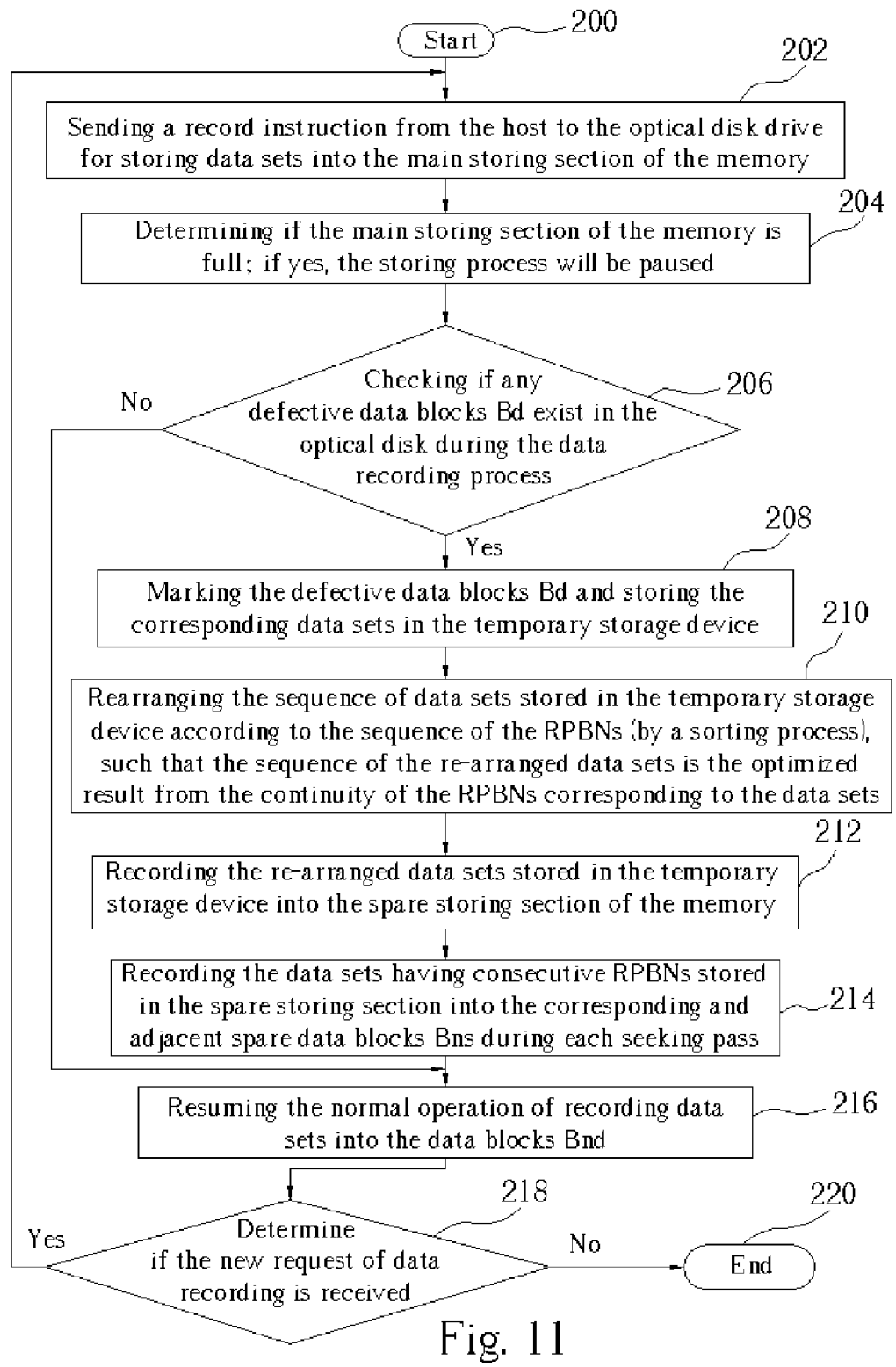
FIG. 11 is a flowchart of the data recording function of an optical disc according to an embodiment of the present invention.

FIG. 10 clearly shows that the sequence of the five data sets "Bnd(1), Bnd(2), Bnd(3), Bnd(4), Bnd(5)" stored in the temporary storage device 43, such that the five RPBNs corresponding to the five data sets are five consecutive RPBNs, namely, when finally recording the five data sets into the corresponding spare data blocks Bns of the optical disc 42 as replacements, the five data sets will be recorded into the five adjacent spare data blocks Bns of the optical disc 42. Afterwards, the five re-arranged data sets will be sent to and temporarily stored in the spare storing section 49 of the memory according to the sequence, and will be finally recorded into the corresponding spare data blocks Bns of the optical disc 42 to accomplish the defect management mechanism of the optical disc 42. Please refer to FIG. 11. FIG. 11 is a flowchart of the data recording function of the optical disc 42 according to an embodiment of the present invention. The flow chart comprises the following steps:

Step 200: Start;

Step 202: The optical disk drive 30 receives an instruction for recording data sets transmitted from the host 46 and it becomes ready to record a plurality of data sets transmitted from the host 46 onto the optical disc 42. Before the optical disk drive 30 records the data sets onto the optical disc 42, the data sets transmitted from the host 46 will be first temporarily stored in the main storing section 47 of the memory 40;

Step 204: In the process of storing data sets transmitted from the host 46, the main storing section 47 of the memory 40 is determined whether it is full; if the main storing section 47 is full, the process of storing data sets into the main storing section 47 of the memory 40 will be paused, and go to step 206;

Step 206: Check if any defective data blocks Bnd exist in the data recording process of the optical disc 42. If a defective data block Bnd exists, go to step 208; if not, go to step 216;

Step 208: According to the present invention, the defective data blocks Bnd will be marked, and the corresponding data sets will be first sent to and stored in the temporary storage device 43. At the same time, determine if the temporary storage device 43 is full; if the amount of data sets corresponding to the defective data blocks Bnd does not exceed the capacity of the temporary storage device 43, go to step 210; if the temporary storage device 43 is full during the transmission of data sets, the process of recording data sets onto the temporary storage device 43 will be paused and go to step 210;

Step 210: The sequence of data sets stored in the temporary storage device 43 will be re-arranged according to the sequence of the RPBNs, namely, by the operation of the above-mentioned sorting process according to the present invention to re-arrange the sequence of the data sets, such that the sequence of the re-arranged data sets after the sorting process is the optimized continuity of the RPBNs corresponding to the data sets. As shown in the embodiments in FIG. 9 and FIG. 10, the five RPBNs corresponding to the five re-arranged data sets are five consecutive RPBNs;

Step 212: Record the re-arranged data sets stored in the temporary storage device 43 into the spare storing section 49 of the memory 40 after the sorting process;

Step 214: Record the data sets stored in the spare storing section 49 of the memory 40 (after the sorting process) into the spare data blocks Bns as replacements. According to the defective table DT, the optical disk drive 30 can find out the numbers of spare data blocks Bns corresponding to defective data blocks Bnd, and make the pickup head 36 seek to the locations of the spare data blocks Bns as replacements. At each seeking process, a plurality of data sets having consecutive RPBNs can be recorded into the corresponding and adjacent spare data blocks Bns of the optical disc 42;

Step 216: Proceed to record data sets normally, namely, to record the data sets into the data blocks Bnd assigned by the host 46. If the process is from step 214 to the present step, which means that after the optical disk drive 30 moves the pickup head 36 in the step 214 to record the data sets into the spare data blocks Bns, the optical disk drive 30 moves the pickup head 36 again to the locations of the corresponding data blocks Bnd, and proceed to record the data sets;

Step 218: Determine if any new request of data recording is received. If yes, go back to step 202 and process the following data recording; if not, go to step 220;

Step 220: End the operation of data recording, and finish the process according to the embodiment.

It is to be noted that the main storing section 47 of the memory can be a ring buffer memory. At step 204, the method for determining whether the main storing section 47 of the memory 40 is full is described below: during the checking process, the first checked defective data block Bnd is marked with a "Write-done Point" tag. If the data sets transmitted from the host 46 start to occupy the marked area with a "Write-done Point" tag in the main storing section 47 of the memory 40, the main storing section 47 is full and storing data sets into the main storing section 47 of the memory 40 is paused.

Figure 12:
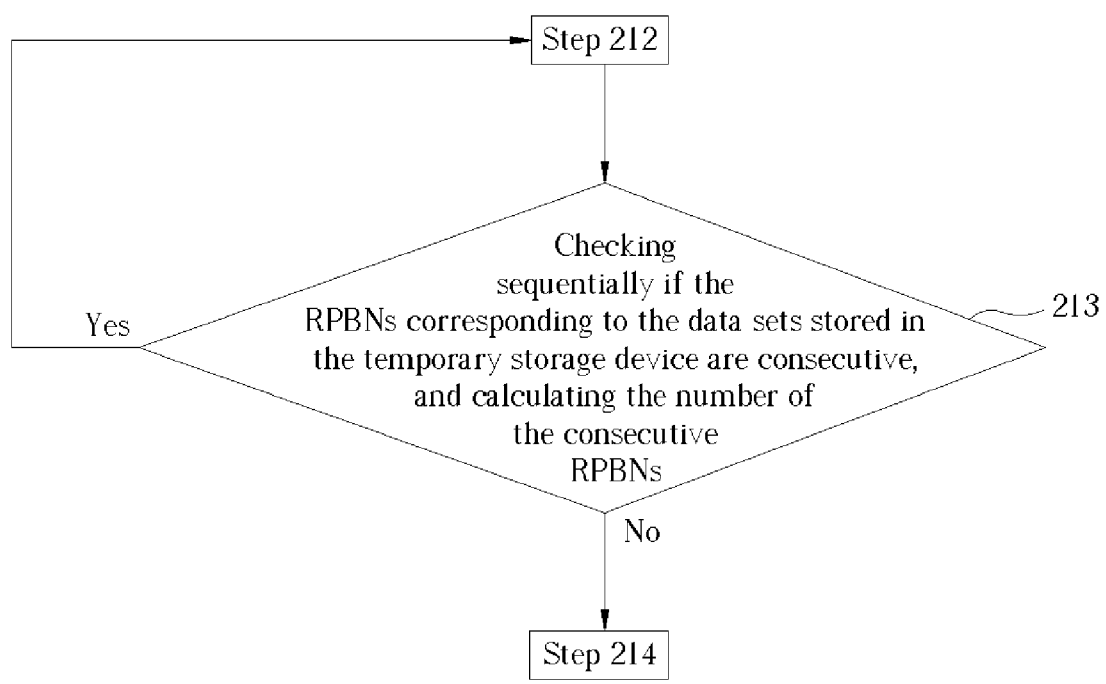
FIG. 12 is a flowchart of the data recording function of an optical disc according to another embodiment of the present invention.

Moreover, during a seeking process, the pickup head 36 can only record the data sets into the plurality of adjacent spare data blocks Bns, and these adjacent spare data blocks Bns correspond to the consecutive RPBNs. Hence, in the above-mentioned step 210, because the sequence of the data sets after the sorting process has the optimized continuity of the RPBNs corresponding to the data sets, during each seeking process in the following step 214 (after the sorting process in the above-mentioned step 210), the "maximum" number of data sets corresponding to the consecutive RPBNs can be recorded into the corresponding and adjacent spare data blocks Bns of the optical disc 42 without proceeding with a new seeking operation according to the prior art. According to the prior art, because the continuity of the RPBNs is not processed, such that if there are in-consecutive RPBNs, a new seeking operation is necessary. Hence, the burden of the pickup head 36 is increased and the efficiency is reduced. In fact, if go back to check step 210, after the optimization of continuity of the RPBNs, the RPBNs corresponding to the data sets stored in the temporary storage device 43 still cannot be ensured to be consecutive, wherein one reason is that parts of the spare data block Bns of the optical disc 42 are also defective. Hence, in the flow chart of the present embodiment, step 213 can be added between step 212 and step 214. Please refer to FIG. 12, which is a flowchart according to FIG. 11 with a newly-added step. The newly-added step 213 is:

Step 213: Sequentially check if the RPBNs corresponding to the data sets stored in the temporary storage device 43 are consecutive, and calculate the number of the consecutive RPBNs. If sequentially-checked RPBNs have consecutive numbers, go to step 212 to record the data sets stored in the temporary storage device 43 corresponding to the consecutive RPBNs into the spare storing section 49 of the memory 40; if an inconsecutive RPBN is found, go to step 214 to record the data sets stored in the spare storing section 49 of the memory 40 corresponding to the consecutive RPBNs into the spare data blocks Bns of the optical disc 42 as replacements during a seeking process.

Please note that in step 213, if the sequentially-checked RPBNs are consecutive numbers, each data set in the temporary storage device 43 will be sequentially recorded into the spare storing section 49 of the memory 40. Because each data set sequentially recorded into the spare storing section 49 of the memory 40 has a consecutive RPBN, they also can be sequentially recorded into the corresponding and adjacent spare data blocks Bns of the optical disc 42 during a seeking process when they are simultaneously stored in the spare storing section 49. According to the above-mentioned operation, the spare storing section 49 can be implemented with a ring buffer memory to make use of the spare storing section 49 repeatedly, such that the amount of data sets corresponding to the defective data blocks Bnd that can be processed during each seeking process is not limited to the capacity of the spare storing section 49 of the memory 40.

In practical implementation, as mentioned above, by using the design of the ring buffer memory, each data set stored in the temporary storage device 43 that has a consecutive RPBN will be sequentially recorded into the spare storing section 49 of the memory 40. In the meanwhile, each data set sent to the spare storing section 49 is sequentially recorded into the corresponding and adjacent spare data block Bns of the optical disc 42. The above-mentioned operation can be implemented with a build-in command system. The command system is integrated with the functions of hardware and software, and utilizes the temporary storing indices corresponding to the data sets and related numbers to accomplish consecutive and continuous data transmissions and data recording. Actually, a method which is included in the technical features according to the claimed invention is adopted to record a plurality of checked data sets those have consecutive spare data block numbers into the spare storing section 49 in one processing process from the step 212 to the step 214, and then record these data sets stored in the spare storing section 49 into the spare data blocks Bns of the optical disc 42 in one processing process. Therefore despite the sorting order of the data sets in the spare storing section having the optimized sequence for the RPBNs, the seeking processes of the pickup head 36 can be substantially reduced, however, the amount of the data sets corresponding to defective data blocks Bnd processed in a seeking process is limited to the size of the capacity of the spare storing section 49 of the memory 40.

The disclosed method and structure for the defect management of an optical disc according to the present invention can be applied to all kinds of re-writing optical storage media (e.g., an optical disk conforming to a CD-MRW standard, a DVD+MRW standard or other standards) and any corresponding optical storage systems. The structure of the optical storage system according to the present invention comprises a temporary storage device utilized for temporarily storing a plurality of checked data sets corresponding to the defective data blocks inspected in the main storing section. According to the present invention, the data sets stored in the temporary storage device are re-arranged according to a sorting process and a sequence of corresponding PRBNs, such that the sequence of the re-arranged data sets after the sorting process is the optimized sequence of the RPBNs corresponding to the re-arranged data sets. Finally, the re-arranged data sets are recorded into the spare storing section of the memory and the spare data blocks of the optical disc, such that the amount of recording data sets that are recorded into the spare data blocks is substantially increased, and the required seeking processes are reduced. In addition, the main storing section and the spare storing section of the memory are respectively a ring buffer memory according to the present invention. With the addition of a temporary storage device and a sorting process according to the present invention, the amount of defective data blocks processed in each seeking process is not limited to the capacity of the spare storing section without increasing the cost but yet the efficiency of data recording is obviously improved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for recording a plurality of data sets onto an optical storage medium by utilizing a temporary storage device in an optical storage system, the optical storage system comprising a memory for storing the plurality of data sets, the optical storage medium comprising a plurality of data blocks and a plurality of spare data blocks being installed on the optical storage medium, each data block being utilized for recording a data set, each spare data block being utilized for substituting for a defective data block to record the data set corresponding to the defective data block, the method comprising:

storing a plurality of data sets corresponding to a plurality of defective data blocks in the memory into the temporary storage device;

re-arranging a sequence of the plurality of data sets corresponding to the plurality of defective data blocks in the temporary storage device according to a sorting process; and recording the plurality of re-arranged data sets in the temporary storage device into the plurality of spare data blocks of the optical storage medium.

2. The method of claim 1 wherein each data set corresponding to a defective data block corresponds to a spare data block number, and each spare data block number corresponds to a spare data block of the optical storage medium; the method further comprising:

utilizing the sorting process to arrange the plurality of data sets in the temporary storage device according to a sequence of the plurality of spare data block numbers.

3. The method of claim 2 wherein each relationship between a data set corresponding to a defective data block and a spare data block number is recorded in a defect record table of the optical storage medium.

4. The method of claim 2 wherein the memory comprises a main storing section and a spare storing section, the main storing section utilized for storing a plurality of data sets transmitted from a main controller, the spare storing section utilized for storing a plurality of data sets corresponding to a plurality of defective data blocks; the method further comprising:

sequentially recording a plurality of data sets corresponding to consecutive spare data block numbers in the temporary storage device into the spare storing section; and sequentially recording a plurality of data sets corresponding to consecutive spare data block numbers in the spare storing section into a plurality of adjacent spare data blocks of the optical storage medium during a seeking process.

5. The method of claim 4 wherein the main storing section and the spare storing section of the memory are respectively a ring buffer.

6. The method of claim 4 further comprising:
recording a predetermined number of data sets corresponding to consecutive spare data block numbers in the temporary storage device into the spare storing section at a time; and
recording a predetermined number of data sets corresponding to consecutive spare data block numbers in the spare storing section into a plurality of adjacent spare data blocks of the optical storage medium at a time;
wherein the predetermined number is determined according to a memory capacity of the spare storing section.

7. The method of claim 1 wherein the optical storage medium is an optical disc conforming to a CD-MRW (Compact Disk-Mount Rainier ReWritable) standard, an optical disk conforming to a DVD (Digital Versatile Disk)+MRW standard, or other re-writable optical storage media.

8. A method for recording a plurality of data sets onto an optical storage medium in an optical storage system to reduce seeking processes, the optical storage medium being installed with a plurality of data blocks and a plurality of spare data blocks, each data block utilized for recording a data set, each spare data block utilized for substituting for a defective data block to record a data set corresponding to the defective data block, the optical storage system comprising:
a memory comprising a main storing section and a spare storing section; and
a temporary storage device electrically connected to the memory for temporarily storing data sets;
the method comprising:
utilizing the main storing section to store the plurality of data sets;
storing a predetermined number of data sets corresponding to a predetermined number of defective data blocks in the main storing section into the temporary storage device, wherein the predetermined number is determined according to a memory capacity of the main storing section;
re-arranging a sequence of the predetermined number of data sets in the temporary storage device according to a sorting process;
recording the predetermined number of re-arranged data sets in the temporary storage device into the spare storing section; and
recording the predetermined number of re-arranged data sets in the spare storing section into a predetermined number of corresponding spare data blocks of the optical storage medium.

9. The method of claim 8 wherein each data set corresponding to a defective data block corresponds to a spare data block number, and each spare data block number corresponds to a spare data block of the optical storage medium; the method further comprising:
utilizing the sorting process to arrange the predetermined number of data sets in the temporary storage device according to a sequence of the predetermined number of spare data block numbers.

10. The method of claim 9 further comprising:
sequentially recording the predetermined number of data sets in the temporary storage device into the spare storing section; and
sequentially recording a plurality of data sets corresponding to consecutive spare data block numbers among the predetermined number of data sets into a plurality of adjacent spare data blocks of the optical storage medium during a seeking process.

11. The method of claim 9 wherein each relationship between a data set corresponding to a defective data block and a spare data block number is recorded in a defect record table of the optical storage medium.

12. The method of claim 8 wherein the main storing section and the spare storing section of the memory are respectively a ring buffer.

13. The method of claim 8 wherein the optical storage medium is an optical disc conforming to a CD-MRW (Compact Disk-Mount Rainier ReWritable) standard, an optical disk conforming to a DVD (Digital Versatile Disk)+MRW standard, or other re-writable optical storage media.

14. A method for recording a plurality of data sets into a plurality of adjacent spare data blocks of an optical storage medium during a seeking process, each data set corresponding to a spare data block number, each spare data block number corresponding to a spare data block, the method comprising:
(a) arranging the plurality of data sets according to a sequence of the plurality of corresponding spare data block numbers so that the plurality of spare data block numbers of the plurality of arranged data sets become consecutive spare data block numbers; and
(b) after proceeding with step(a), recording the plurality of arranged data sets into a plurality of adjacent spare data blocks during a seeking process.

15. The method of claim 14 wherein the optical storage medium further comprises a plurality of data blocks, and each spare data block is utilized for substituting for a defective data block to record a data set corresponding to the defective data block.

16. The method of claim 14 being applied to an optical storage system, wherein the optical storage medium is an optical disc conforming to a CD-MRW (Compact Disk-Mount Rainier ReWritable ) standard, an optical disk conforming to a DVD (Digital Versatile Disk)+MRW standard, or other re-writable optical storage media.

* * * * *